Figure 1:
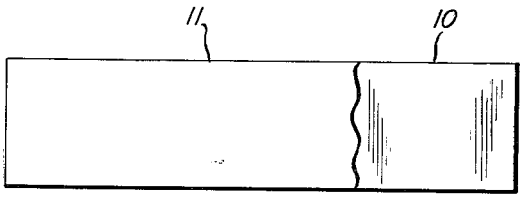

United States Patent Office 3,090,698
Patented May 21, 1963

3,090,698
PROCESS FOR IRRADIATING HIGH HYDROCARBON COATINGS ON METAL TO FORM POLYMERIC COATINGS AND RESULTANT ARTICLE
Alexander Thomas Wilson, Wellington, New Zealand, assignor to Standard Oil Company, Chicago, Ill., a corporation of Indiana
Filed Feb. 14, 1961, Ser. No. 89,318
7 Claims. (Cl. 117—62)

My invention relates to new products comprising solid state polymerized coatings produced from various heavy oils and waxes by irradiation. In particular, the invention provides hard flexible infusible coatings bonded to the surfaces of metal articles including sheet and various fabricated metal articles. It also relates to an economical process for producing chemically coated metal articles.

The invention is based in part on the finding that higher hydrocarbons such as heavy aliphatic oils and waxes, when exposed as a thin sheet or film on a metal surface to ionizing radiation from a low voltage electron accelerator, can be converted to hard relatively infusible plastic films and coatings which are tenaciously bound to the metal surface. The mechanism probably involves cross-linking of hydrocarbon molecules by reaction of free radicals formed by the ionizing radiation. The intensity of radiation required appears to be of the order of that required for cross-linking, e.g., upwards of about 10 kilowatt hours per pound of product, and the resulting films and coatings appear to be of very high molecular weight. Some reaction with the metal surface, however, also appears to be involved, for sufficient voltage to fully penetrate the organic film appears to be necessary for good bonding and the metals that have been successfully coated are known to form surface oxides readily. Moreover, best results are obtained by using coating materials containing a polar constituent or by using a polar compound in combination.

I have found that the process is applicable to a variety of related organic chemical materials comprising normally low melting solids such as waxes (including low molecular weight polyolefin waxes), fatty acids and viscous aliphatic oils including mineral lubricating oil fractions, partially polymerized aliphatic oils of olefinic nature, white oils and the like. Of these, petroleum waxes, including paraffin, microcrystalline, petrolatum and slack waxes have particular value, especially when modified by incorporation of a minor amount of a compatible miscible polar substance. The starting materials must be relatively nonvolatile because application of the radiation energy by means of charged particles requires operation under vacuum. I have discovered that the process can be applied with special advantage to the production of asphalt coatings from petroleum asphalts and reduced crudes, which was particularly surprising since aromatic molecules, and particularly condensed ring aromatic molecules are considered traps for irradiation energy. I have found, moreover, that the process can be applied to essentially aromatic materials such as coal tar, pitches and aromatic petroleum extract oils.

The resulting metal coatings are chemically inert and of very high molecular weight. They are resistant to solvents, acids and alkalies. They are thermally stable and infusible to a surprising degree. For example, thin steel plate coated with irradiated paraffin wax can be heated almost red hot without destroying the film. Only after prolonged application of heat is the wax film destroyed. The coatings are highly adhesive and flexible. For example, an irradiated wax coated tin plate can be bent in two without rupturing the film.

In view of these physical and chemical properties, the new products have a wide range of application. Coated light steel plate can be used to replace tin plate or resin coated plate in canning corrosive or perishable products, particularly beer, food products and the like. Raw metal sheet can be coated and fabricated into a wide variety of manufactured articles, including articles for high temperature service. Since the coatings are non-metallic, they have added value in protection against corrosion. Unlike tin plated or zinc plated galvanized sheet, the chemically coated metals are free from electrolytic corrosive effects. The films and coatings have excellent dielectric properties and can be used as insulating in electrical fabrication. Examples are: coated copper wire; very small, efficient condensors made, for example, from pieces of thin coated aluminum foil; and laminated transformers of small size and high efficiency.

The coated metal articles of the invention are characterized by extremely adhesive coatings which appear to be produced because the chemical starting material is advantageously extended on the surface by application in the form of a liquid which flows into all of the microscopic crevices of the metallic surfaces. Upon irradiation, the resulting film or sheet of liquid is converted to a cross-linked solid polymeric sheet in which the material that flowed into the crevices forms effective anchoring for the coating. Metal oxide molecules in the supporting surface also may be a factor in bonding. Chemical bonding, however, is promoted by using polar substances such as higher aliphatic acids, esters, alcohols and the like, which are soluble in or miscible with the hydrocarbon starting material. The polar materials can be used in admixture with hydrocarbon materials such as mineral oils and waxes, or with particular advantage by application of a mono-layer of the polar substance, e.g., stearic acid, on the metal surface as an undercoating, followed by superimposing a hydrocarbon coating, e.g., wax, petrolatum or asphalt. The polar carboxyl groups of the stearic acid affix themselves to the metal surface, e.g., sheet iron, while the long hydrocarbon chains are effectively cross-linked with the molecules of the hydrocarbon overcoat when the ionizing radiation is applied to the multi-layer coating. Various long chain polar compounds such as preferentially oil soluble sulfonates, phosphates and the like may be used. For bonding to an acidic type surface, e.g., a painted (oxidized) or enameled metal surface, oil soluble long chain molecules containing a basic group such as long chain amines can be used.

The properties of the new products depend to an important extent on selection of the chemical starting materials. For example, paraffin wax when modified by incorporation of a minor amount, e.g., about 0.01 to 10 weight percent or more of stearic acid, appears to provide superior coatings for metals in terms of adhesion, hardness, infusibility, flexibility and appearance. Asphalt also gives coatings of surprising flexibility, adhesiveness and infusibility. Fats, e.g., tallow, on the other hand, appear to give poorly bonded films rather than bonded coatings.

The lighter colored materials can be appropriately modified by incorporation of various compatible organic and inorganic pigments which are stable (or suitably modified) under the ionizing radiation. For example, aluminum powder, titania, carbon black and organic dyes have value. Certain heavy metal oxides, e.g., lead chromate, as is known in the general art of radiation chemistry, can be incorporated to improve the efficiency of the cross-linking process. The properties of the films and coatings can be adjusted by variation in radiation time and intensity.

In producing the polymerized coatings of the invention, the chemical starting material is extended in the form of a film on the supporting metal surface for exposure to the ionizing radiation. This may require heating to melt or reduce the viscosity of the heavier materials. The metal sheet (or wire) can be fed from a rolling (or extrusion) mill directly to the process. For example, it can be drawn through a liquid bath of the chemical starting material, e.g., molten wax, and then passed through a suitable sealing chamber or device into the radiation zone. The radiation atmosphere should be essentially non-oxidizing for controlled production of good coatings and, in the case of irradiation with electrons or other charged particles, must be substantially material free. Consequently, a high vacuum, e.g., about $10^{-3}$ to $10^{-6}$ mm. of mercury should be applied to the radiation chamber.

Advantageously, a low voltage electron accelerator is used as the source of the ionizing radiation. In contrast to the use of high voltage accelerators by experimental physicists and most investigators in the radiation field, a large quantity of electrons of low energy rather than a small stream of electrons at high energy level is desired. The electrons are generated by applying a potential difference between one or more heated filaments and the coating to be irradiated. The energy required depends on the thickness of the film or coating to be irradiated. Thus, I have found that a film of wax of about 0.001 cm. is readily penetrated with 50 kilovolts whereas 250 kilovolts may be required for penetration of a 0.05 cm. coating. Suitably, the energy range is about 1,000 to less than 500,000 volts, advantageously 10,000 to 150,000 volts. Too high a voltage must be avoided, not only because it is wasteful, but because undesirable heating of the metal plate results, with the likelihood of excessive distillation and thermal decomposition of the chemical materials rather than cross-linking and surface bonding. By controlling the voltage, it is possible to modify the cross-sectional properties of the coating. Thus by treating at different voltage levels and repassing the sheet through the radiation zone, coatings harder at the surface, or the reverse, can be produced. By use of thicker edges, or selectively less polymerized edges, sheets capable of being joined by press sealing can be produced.

The irradiation intensity required for cross-linking depends to a large extent on the molecular weight of the chemical starting materials and also must be correlated with irradiation time. In general, the required intensity varies inversely with the molecular weight. Thus, I have found that when irradiating paraffin wax (averaging about 24 carbon atoms) with 50,000 volt electrons a dose of 1.68 microampere-hours per cm.$^2$ produces a satisfactory coating. One ampere-hour would therefore produce 600,000 cm.$^2$ of coating. A $C_{48}$ hydrocarbon would require about half as much dose (i.e., about 0.84 microampere-hour/cm.$^2$). Of course, a thinner coating would require correspondingly lower voltage and consequently less net energy per square centimeter whereas a thicker coating would require higher voltage and more energy per square centimeter. Hence, taking into account the molecular weight of the supporting material, either or both the amperage and irradiation time can be controlled to produce films and coatings of the desired properties. For example, 0.1 microampere-hour/cm.$^2$ to 100 microampere-hours/cm.$^2$ may be used in producing irradiated wax coatings from a typical commercial paraffin wax although 1.5 to 3 microampere-hours/cm.$^2$ constitutes a better range. At the lower dosage levels, the coatings are softer, and at the higher dosage level the coatings are more brittle.

Although I prefer to use a low voltage electronic accelerator as the source of ionizing radiation in the practice of the invention, it is conceivable that other sources of ionizing radiation, controlled to apply cross-linking intensity, may have value. For example, proton or alpha particles may be used instead of electrons by feeding hydrogen or helium, respectively, to high voltage accelerators. The resulting radiation, however, is more difficult to apply in a controlled manner, and, because voltage requirements will be higher by a factor of approximately 1,000, would appear to be much more costly. Ionizing radiation from radioactive/isotopes also conceivably might be used. For example, a low energy beta or alpha emitter having a short half life might be used by admixing it in very low concentrations with the chemical to be converted, or off-gases including xenon from a nuclear reactor might be passed over the coated surface.

The following examples illustrate in a general way the range of products that can be produced by application of the invention.

*Example I*

An RCA electron microscope was used as the source of electrons. The unit produced 50 kilovolt electrons and was capable of producing up to one milliampere of current. Under the conditions of the example, the current delivery was estimated at 100 microampere. A film of about 0.001 cm. thickness was prepared from a mixture of paraffin wax and 1% stearic acid and applied to the iron target plate (cleaned with acid and acetone) of the electron microscope. When the coated iron plate was exposed to electron radiation, after evacuation, in the target holder of the machine, a hard, infusible film was formed in about 1 second. Larger films, of about 125 square centimeters, were produced by exposing the target plate in the photographic plate holder, using about 15 minutes to pass the plate through the electron beam.

The resulting coatings were hard, very adhesive and translucent.

*Example II*

A coating was made using the technique of Example I with a film of paraffin wax containing 1% each of stearic acid and titania. A good quality white colored coating was attained.

*Example III*

An irradiated wax coating was prepared by the technique of Example I. Although a coating of good physical properties was obtained, the adhesion of the coating to the metal surfaces was not quite as strong as in the case of the coating of Example I.

In similar tests, satisfactory coatings were made using stearic acid alone, pigmented wax pencils for marking glass (black, blue and orange), medicinal grade white mineral oil (the coating was improved by incorporation of 1% stearic acid), polyisobutylene, paraffin waxes containing organic pigments, paraffin wax containing carbon black and asphalt. Copper, aluminum and chrome plate were tested in addition to iron as supporting metals with stearic acid and with paraffin wax 1% stearic acid mixtures. Satisfactory coatings were obtained.

All of the films and coatings prepared in the above examples were insoluble in organic solvents. The paraffin-stearic acid films were not affected by strong acid or alkali and had to be heated almost to red-heat before breakdown occurred. The asphalt coatings showed an even higher temperature stability. Also, it was not possible to remove the asphalt by scratching with a finger nail even after bending the coated piece through 360°.

For diagrammatic illustration of the invention, reference may be had to the following figures of the accompanying drawing.

FIGURE 1 represents in plan form, a coated sheet metal article which is broadly illustrative of the invention. Reference 10 depicts the base metal sheet, with the coating cut away. The coating, for example, a wax film which has been irradiated in situ to a tough flexible insoluble and relatively infusible coating, is depicted by reference 11.

Figure 2:

FIGURE 2 represents a sketch of a short piece of wire, 12, coated according to the invention, again with the coating, 11, partially cut away.

Figure 3:
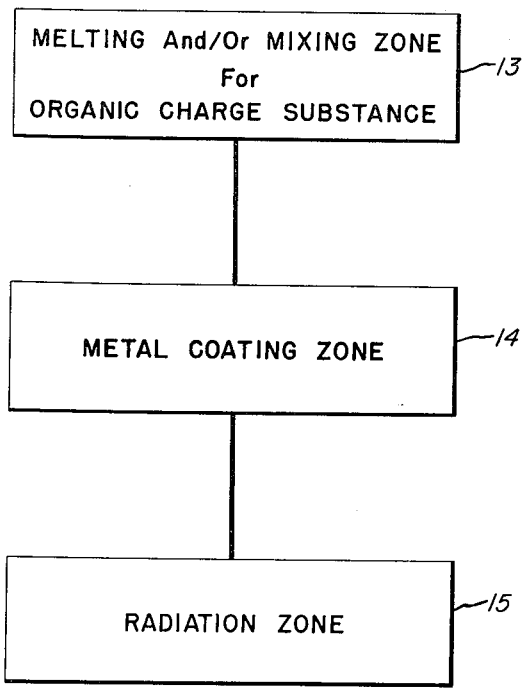

FIGURE 3 provides an illustrative flow diagram for a production process embodying the invention. The organic substance forming the charge to the coating operation is melted in zone 13, where various additives and adjuvants may also be admixed. The metal sheet or other material is fed to coating zone 14 wherein a thin film of the organic charge substance is extended on one or more surfaces of the metal. The coated metal, thereupon, is subjected to radiation of sufficient intensity to promote cross linking and metal bonding in zone 15. Preferably, these operations are conducted sequentially in separate areas according to known techniques, but they may be integrated in a manner such as to combine two or more operations in a single zone.

The following runs are illustrative of film production using a 10 to 50 kv. electron irradiation source at a current intensity of about $1.3 \times 10^{-6}$ amps./cm.$^2$.

| Thickness (cm.) | Voltage (kv.) | Irradiation time (hrs.) | Dose (kwh./lb.) | Comment |
|---|---|---|---|---|
| 0.0002 | 10 | 5 | 320 | Good adherent film, some pinholes. |
| 0.0007 | 30 | 5 | 275 | Do. |
| 0.0006 | 20 | 5 | 215 | Do. |
| 0.0006 | 20 | 1.6 | 70 | Fairly good film, not quite as good as preceding run. |

The films were prepared from Allied Chemical Grade 617 polyethylene wax on black iron plates. Properties of the polyethylene are:

Average molecules, wt_____ 1500
Melting range_____° F__ 210-217
Specific gravity_____ 0.91

The films were applied by painting on a 5 to 10% solution of the wax in hot xylene followed by flashing off the xylene by heating to 100 to 130° C. After irradiation, the samples were treated with boiling xylene to remove any unbound wax and then placed in a humidity cabinet to check for pinholes.

This application is a continuation-in-part of my copending application Serial No. 531,292, filed August 29, 1955, and now abandoned.

I claim:
1. A process for producing solid state polymerized chemical coatings from non-volatile normally low melting point organic substances selected from the class consisting of heavy oils, waxes, fatty acids, and asphalts which comprises extending the chemical starting material in the form of a film on the surface of an oxidizable metal and subjecting it to ionizing radiation in the energy range of about 1,000 to 500,000 volts of cross-linking intensity approximating at least about 10 kilowatt hours per pound of product for a period of time sufficient to convert the starting material to a hardened coating.

2. A process of claim 1 in which the supporting surface is a ferrous metal.

3. A process as in claim 1 in which the chemical starting material is a petroleum wax.

4. The process of claim 3 in which the wax contains a polar compound.

5. A process as in claim 1 in which the ionizing radiation is further characterized by being electron irradiation of low voltage.

6. A process as in claim 5 in which the ionizing radiation is in the energy range of about 10,000 to 150,000 volts.

7. The product produced by the process of claim 1.

References Cited in the file of this patent
UNITED STATES PATENTS

| | | |
|---|---|---|
| 1,818,073 | Long _____ | Aug. 11, 1931 |
| 2,174,840 | Robinson _____ | Oct. 3, 1939 |
| 2,350,330 | Remy _____ | June 6, 1944 |
| 2,731,370 | Tramm _____ | Jan. 17, 1956 |
| 2,790,736 | McLaughlin _____ | Apr. 30, 1957 |

OTHER REFERENCES

Glockler and Lines: "The Electrochemistry of Gases and Other Dielectrics," 1939, John Wiley, pages 84–90.

Charlesby: "Proc. Roy. Society" (London), vol. 222, pp. 60–74 (1954, A).

Modern Plastics, vol. 31, pp. 100, 101, 219 (April 1954).